United States Patent
Hiramatsu

(10) Patent No.: US 9,578,189 B2
(45) Date of Patent: Feb. 21, 2017

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/923,787

(22) Filed: Oct. 27, 2015

(65) Prior Publication Data

US 2016/0112587 A1 Apr. 21, 2016

Related U.S. Application Data

(63) Continuation of application No. 14/166,625, filed on Jan. 28, 2014, now Pat. No. 9,201,493.

(30) Foreign Application Priority Data

Jan. 30, 2013 (JP) .................. 2013-015875

(51) Int. Cl.
*H04N 5/225* (2006.01)
*H04N 1/00* (2006.01)
*G06F 3/00* (2006.01)
*H04N 1/32* (2006.01)
*H04N 101/00* (2006.01)

(52) U.S. Cl.
CPC .......... *H04N 1/00307* (2013.01); *G06F 3/005* (2013.01); *H04N 1/00477* (2013.01); *H04N 1/32363* (2013.01); *H04N 2101/00* (2013.01); *H04N 2201/0055* (2013.01); *H04N 2201/0084* (2013.01); *H04N 2201/214* (2013.01); *H04N 2201/218* (2013.01)

(58) Field of Classification Search
CPC . G06F 3/005; H04N 1/00307; H04N 1/32363; H04N 2101/00; H04N 2201/214; H04N 2201/0084; H04N 1/00477; H04N 2201/218; H04N 2201/0055
USPC .................. 348/14.01, 14.02, 207.1, 207.11, 552,348/211.99, 211.1, 211.2, 231.9, 231.1
See application file for complete search history.

(56) References Cited

U.S. PATENT DOCUMENTS 6,967,675 B1 * 11/2005 Ito ...................... H04N 5/23293
348/207.1
2010/0094931 A1 * 4/2010 Hosur ................ H04N 7/17318
709/203

FOREIGN PATENT DOCUMENTS

JP 2002-082861 A 3/2002

* cited by examiner

*Primary Examiner* — Yogesh Aggarwal
(74) *Attorney, Agent, or Firm* — Canon U.S.A., Inc. IP Division

(57) ABSTRACT

A communication apparatus includes a conversion unit configured to convert data, an estimation unit configured to estimate a size after conversion of the data by the conversion unit before the conversion unit converts the data, and a notification unit configured to notify another communication apparatus of the size estimated by the estimation unit.

14 Claims, 8 Drawing Sheets

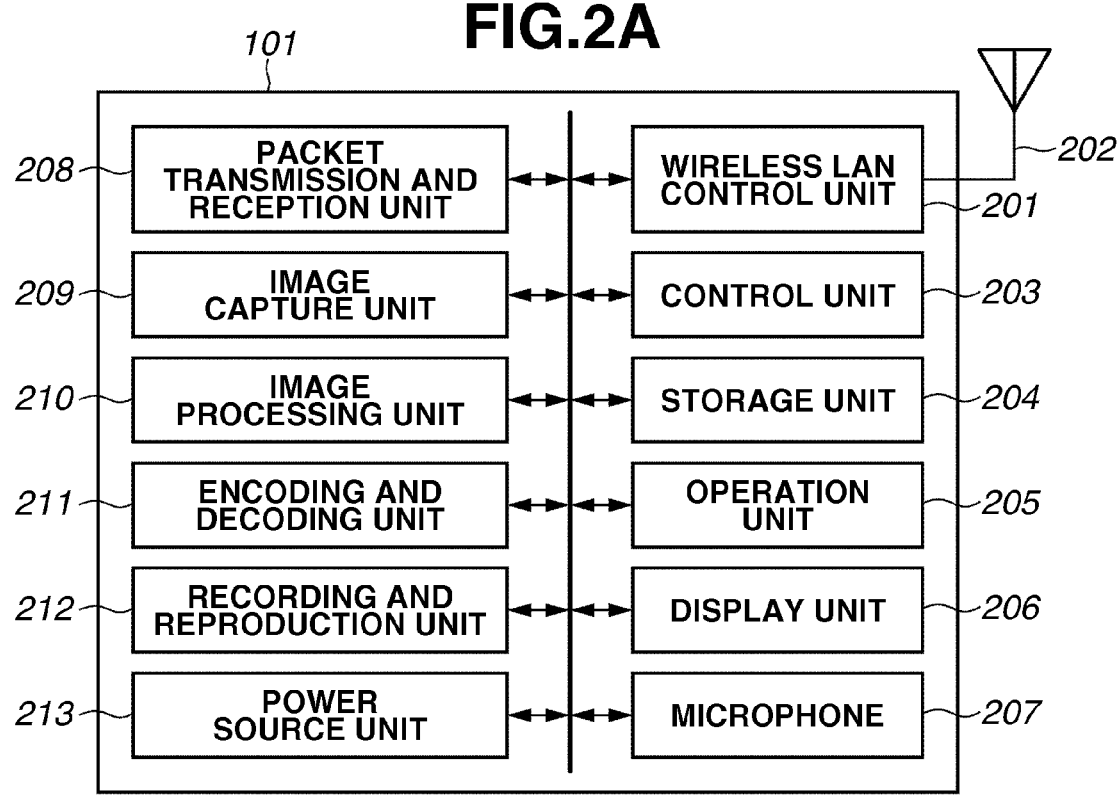
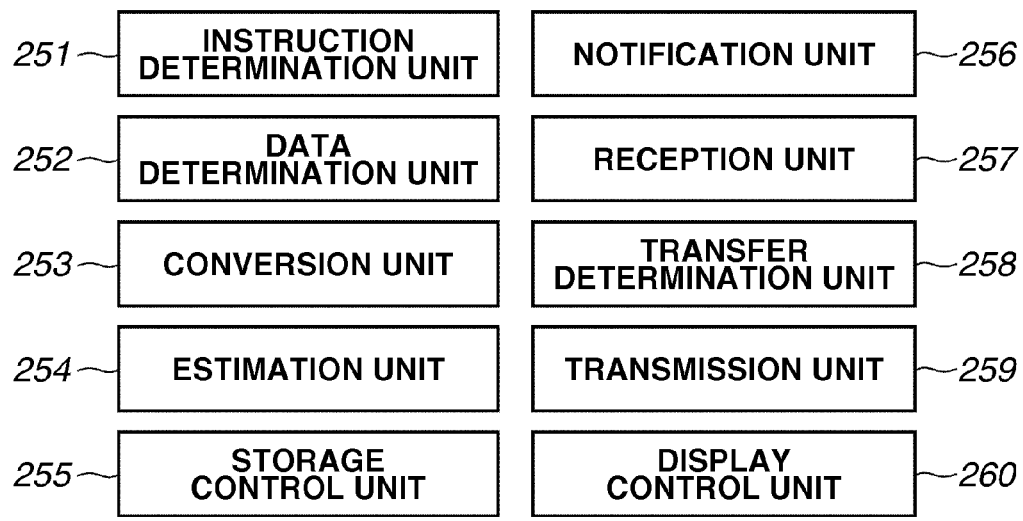

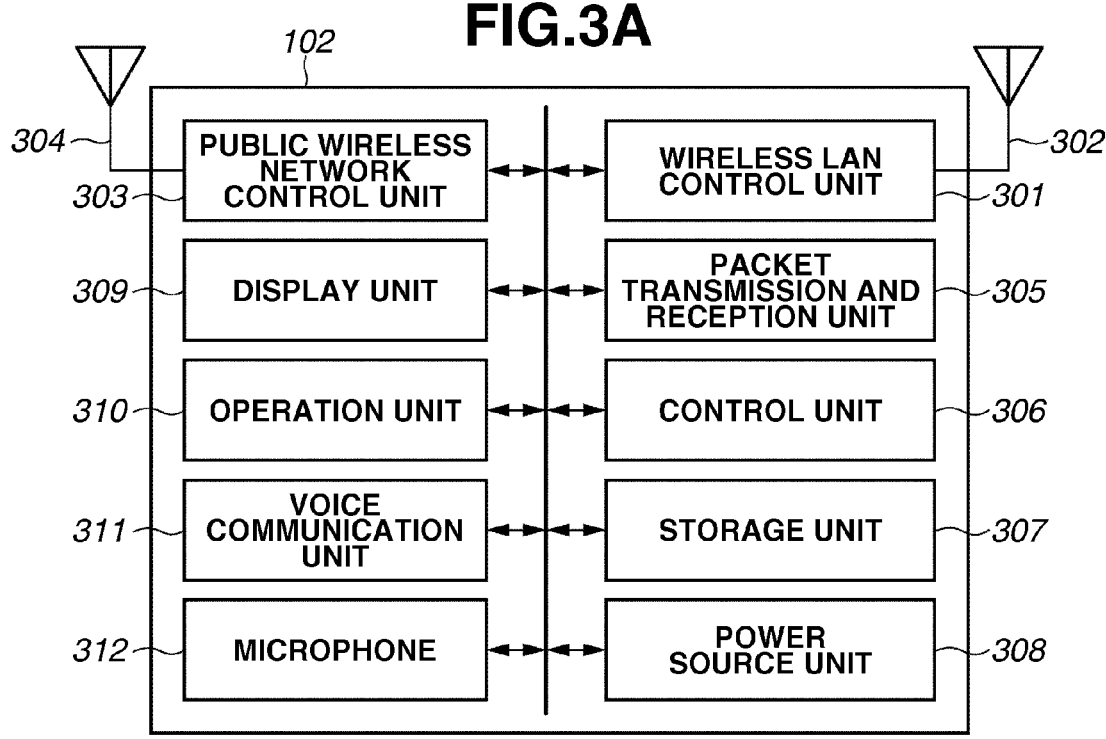
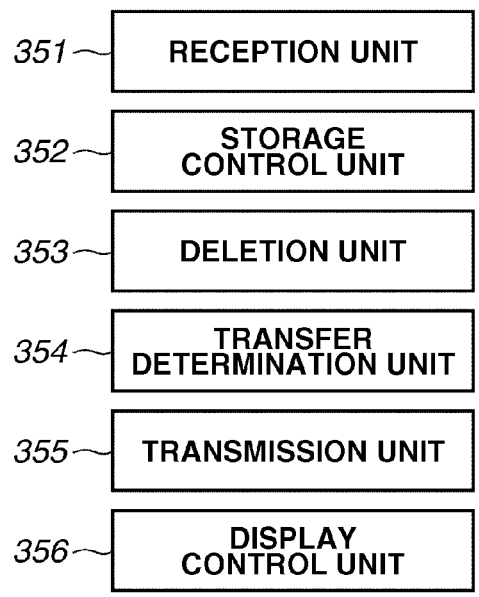

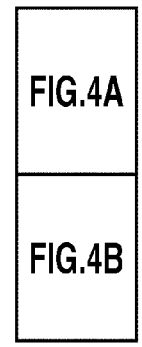
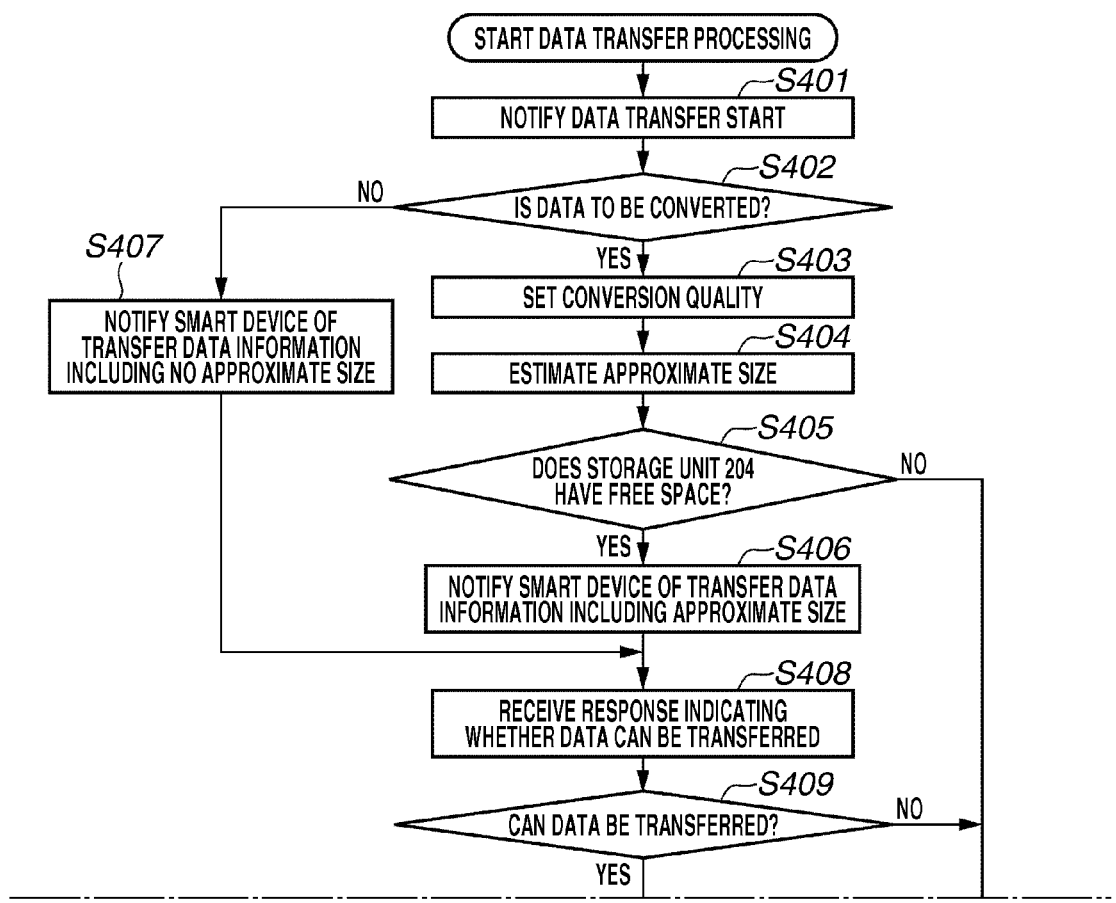
FIG.4A

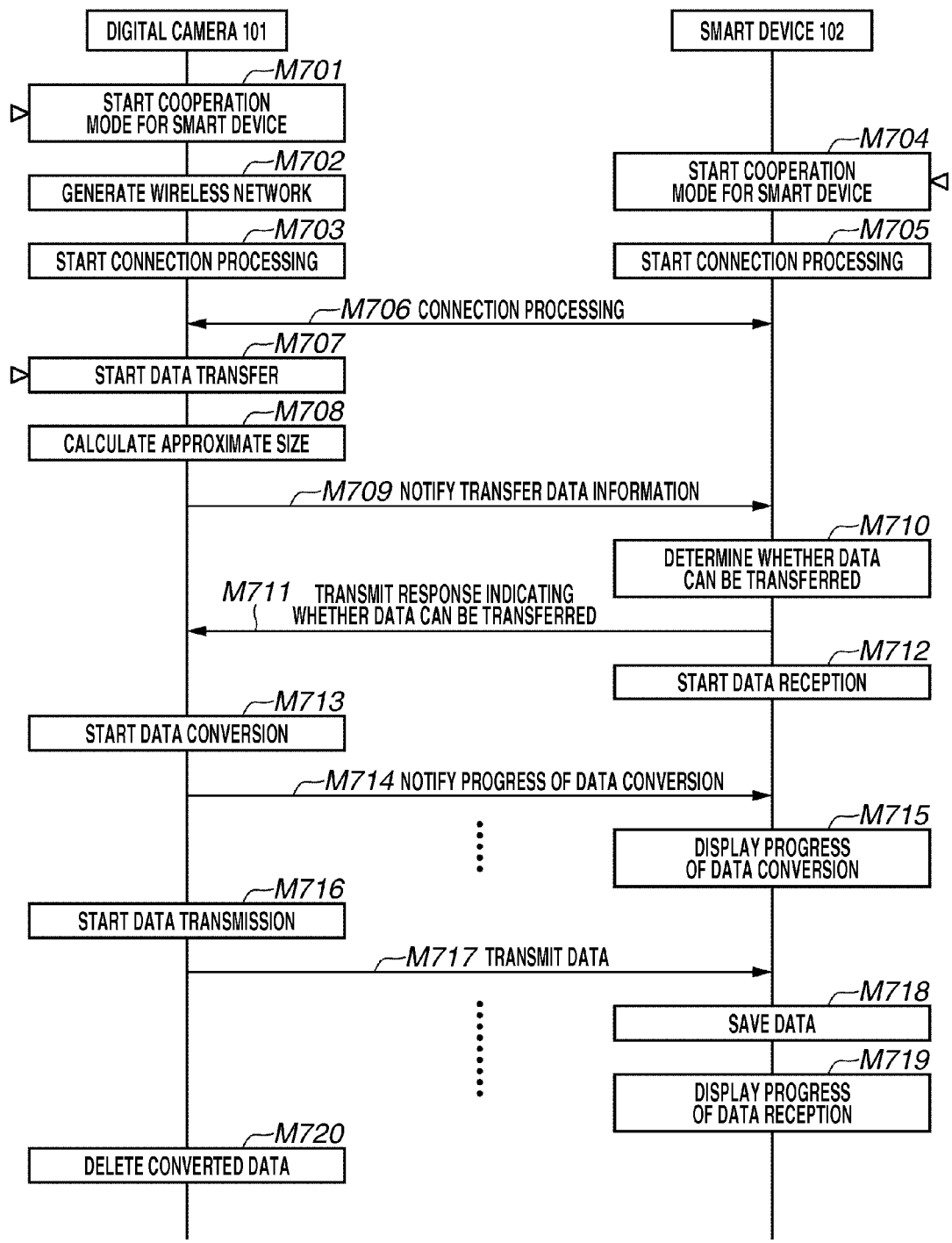

COMMUNICATION APPARATUS, METHOD FOR CONTROLLING COMMUNICATION APPARATUS, AND PROGRAM

CROSS-REFERENCE TO RELATED APPLICATIONS

This application is a continuation of U.S. application Ser. No. 14/166,625, which was filed on Jan. 28, 2014 and which claims priority to Japanese Patent Application No. 2013-015875, which was filed on Jan. 30, 2013. These applications are hereby incorporated by reference in their entireties.

BACKGROUND OF THE INVENTION

Field of the Invention

The present invention relates to a communication apparatus for communicating converted data.

Description of the Related Art

In recent years, a technique for transferring data stored in a communication apparatus to another communication apparatus using wireless communication has been practically used. Since a data storage unit of an apparatus generally has a limited space, when data in a large size is transferred, the storage unit may not have enough free space for the data and thus cannot transfer the data to another communication apparatus. To address this problem, Japanese Patent Application Laid-Open No. 2010-114755 discusses a method in which a conversion unit of an image capture device that reduces a data size to the minimum is previously selected to perform data conversion prior to starting transfer.

However, even when the data size is reduced by performing the data conversion, the data size cannot be always made smaller than the free space of the data storage unit of the communication apparatus, and data transfer can fail. Since the data conversion processing generally requires time, it is not desirable to stop the data transfer after the data is converted.

SUMMARY OF THE INVENTION

The present invention is directed to a method for transmitting notification to another communication apparatus at data conversion when the data is converted and transmitted to the other communication apparatus.

According to an aspect of the present invention, a communication apparatus includes a conversion unit configured to convert data, an estimation unit configured to estimate a size after conversion of the data by the conversion unit before the conversion unit converts the data, and a notification unit configured to notify another communication apparatus of the size estimated by the estimation unit.

Further features of the present invention will become apparent from the following description of exemplary embodiments with reference to the attached drawings.

BRIEF DESCRIPTION OF THE DRAWINGS

FIGS. 2A and 2B are block diagrams illustrating a configuration of a digital camera.

FIGS. 3A and 3B are block diagrams illustrating a configuration of a smart device.

FIG. 4, which includes FIGS. 4A and 4B, is a flowchart illustrating data transfer processing performed by the digital camera according to a first exemplary embodiment.

FIG. 7 is a sequence diagram illustrating data transfer according to the first exemplary embodiment.

DESCRIPTION OF THE EMBODIMENTS

Various exemplary embodiments, features, and aspects of the invention will be described in detail below with reference to the drawings.

Figure 1:
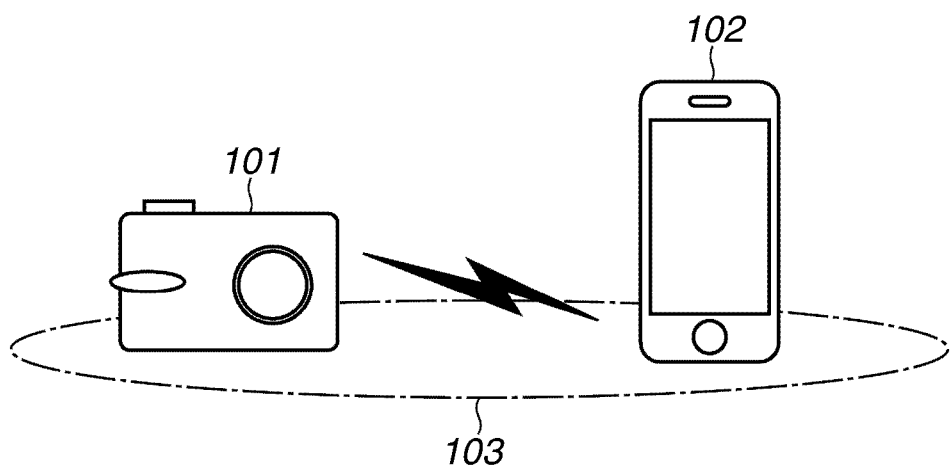
FIG. 1 illustrates a network configuration diagram according to a present exemplary embodiment.

FIG. 1 illustrates a network configuration diagram according to an exemplary embodiment.

The network illustrated in FIG. 1 includes a digital camera 101 serving as a wireless communication apparatus and a smart device 102 serving as another wireless communication apparatus. According to the present exemplary embodiment, the digital camera 101 and the smart device 102 have a wireless communication function.

The wireless communication function according to the present exemplary embodiment is described as a wireless local area network (LAN) function compliant with the IEEE802.11 series. However, alternatively, other wireless communication functions including Bluetooth (registered trademark), multiband orthogonal frequency-division multiplexing (OFDM) alliance (MBOA), ultra wide band (UWB), ZigBee, and near field communication (NFC) may be used. Further, in place of the wireless communication, wired communication such as wired LAN may be used.

UWB includes wireless USB, wireless 1394, and Winet.

Each of the digital camera 101 and the smart device 102 can establish and search a wireless LAN network 103.

FIG. 2A is a block diagram illustrating an example of a hardware configuration of the digital camera 101.

A wireless LAN control unit 201 performs protocol processing on drivers performing various types of control including wireless LAN radio frequency (RF) control, wireless LAN communication processing, and wireless LAN communication compliant with IEEE802.11, and protocol processing relating to the wireless LAN communication. An antenna 202 is used to perform the wireless LAN communication. A control unit 203 controls the entire digital camera 101 by executing a control program stored in a storage unit 204. A storage unit 204 stores the control program to be executed by the control unit 203 and various types of information including a parameter required for communication. Various types of operations described below are performed when the control unit 203 executes the control program stored in the storage unit 204. An operation unit 205 is used to operate the digital camera 101. A display unit 206 performs various types of displays and has a function of outputting visually recognizable information, for example, a liquid crystal display (LCD) and a light emitting diode (LED), and a function of outputting sound, for example, a speaker. The digital camera 101 includes a microphone 207, a packet transmission and reception unit 208 for transmitting and receiving a packet for various types of communications, and an image capture unit 209 for capturing an optical image of an object. An image processing unit 210 converts a captured image output from the image capture unit 209 into image data in a predetermined format and performs various types of processing such as correction of brightness and color of the image data. An encoding and decoding unit 211 performs a predetermined highly-efficient encoding (e.g., discrete cosine transform (DCT) conversion, variable length encoding after quantization) on the image data output from the image processing unit 210. A recording and reproduction unit 212 records and reproduces the compressed and encoded image data into and from a recording medium (not illustrated). A power source unit 213 supplies power to the digital camera 101.

FIG. 2B is a block diagram illustrating a software that can be realized when the control unit 203 reads the program stored in the storage unit 204.

An instruction determination unit 251 determines whether a user has given an instruction to transfer the data via a button of the operation unit 205. A data determination unit 252 determines whether the data to be transferred is to be converted. A conversion unit 253 converts data using the image processing unit 210 and the encoding and decoding unit 211. An estimation unit 254 estimates an approximate size (size value) of converted transfer data. A storage control unit 255 controls the storage unit 204 and determines whether the storage unit 204 has free space.

A notification unit 256 notifies a transmission destination of the data of transfer data information including the approximate size estimated by the estimation unit 254. A reception unit 257 receives a transfer permission or a transfer non-permission. A transfer determination unit 258 determines whether the data can be transferred. A transmission unit 259 transmits the data using the packet transmission and reception unit 208 and the wireless LAN control unit 201. A display control unit 260 controls the display unit 206 to perform various types of displays.

FIG. 3A is a block diagram illustrating one example of a hardware configuration of the smart device 102.

A wireless LAN control unit 301 performs protocol processing on the drivers performing various types of control including the wireless LAN RF control, the wireless LAN communication processing, and the wireless LAN communication compliant with the IEEE802.11 series, and protocol processing relating to the wireless LAN communication. An antenna 302 is used to perform the wireless LAN communication. A public wireless network control unit 303 performs protocol processing on drivers performing RF control, public wireless network communication processing, and various types of control for the public wireless network communication, and protocol processing relating to the public wireless communication. The public wireless communication is compliant with, for example, the international multimedia telecommunications (IMT) standard and the long term evolution (LTE) standard. An antenna 304 is used to perform the public wireless communication. A packet transmission and reception unit 305 transmits and receives the packet for various types of communications. A control unit 306 controls the entire smart device 102 by executing the control program stored in a storage unit 307. The storage unit 307 stores the control program to be executed by the control unit 306 and various types of information about the parameter required for the communication. Various types of operations described below are performed when the control unit 306 executes the control program stored in the storage unit 307. A power source unit 308 supplies power to the smart device 102.

A display unit 309 performs various types of displays and has a function of outputting visually recognizable information, for example, an LCD and an LED, and of outputting sound, for example, a speaker. An operation unit 310 is used to operate the smart device 102. The smart device 102 includes a voice communication unit 311 used by the user to speak and a microphone 312.

FIG. 3B is a block diagram illustrating the software that can be realized when the control unit 306 reads the program stored in the storage unit 307.

A reception unit 351 receives the transfer data information including the approximate size. A storage control unit 352 controls the storage unit 307. A deletion unit 353 deletes the data saved in the storage unit 307. A transfer determination unit 354 determines whether the data can be transferred from the digital camera 101. A transmission unit 355 transmits the transfer permission and the transfer non-permission of the data. A display control unit 356 controls the display unit 309 to perform various types of displays.

All function blocks illustrated in FIGS. 2 and 3 have mutual relationships as software or hardware. Further, the above-described function blocks are described as an example, and a plurality of function blocks may constitute one function block, or any of function blocks may be further divided into blocks performing a plurality of functions.

According to the present exemplary embodiment, when the digital camera 101 and the smart device 102 start a smart device cooperation mode, the digital camera 101 and the smart device 102 activate the wireless LAN function to perform connection processing. Subsequently, when data transfer is instructed, the digital camera 101 calculates an approximate size of the converted data, and then notifies the smart device 102 of the approximate size. The smart device 102 determines whether the data can be transferred based on the approximate size, and responds to the digital camera 101. Upon receiving the transfer permission, the digital camera 101 converts the data, and then transfers the converted data. The above-described processing will be described with reference to FIGS. 4 to 7.

Figure 4B:
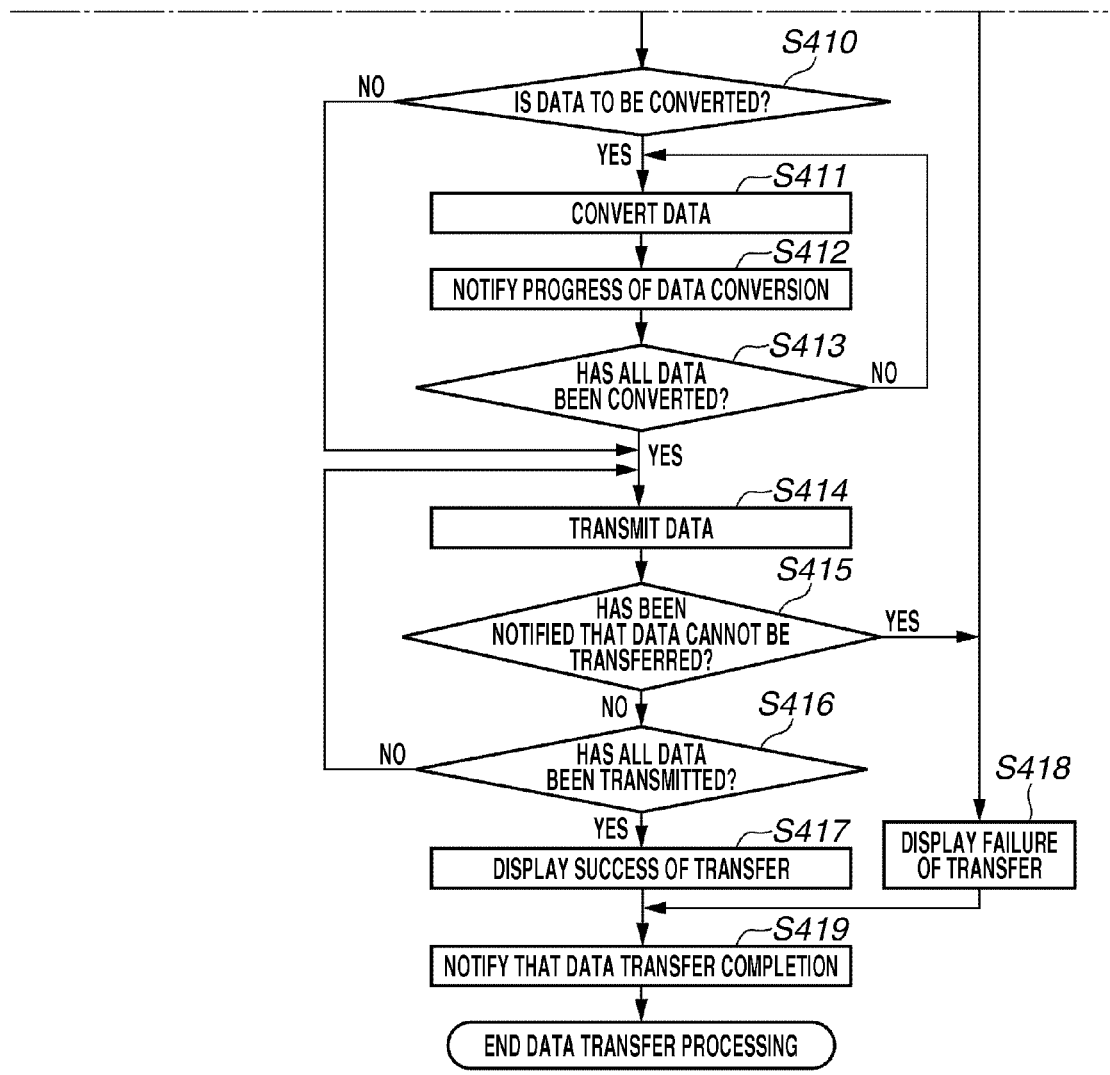

FIG. 4, which includes FIGS. 4A and 4B, is an operation flow when the digital camera 101 starts data transfer processing. The operation flow can be realized by reading and executing the program stored in the storage unit 204 by the control unit 203. According to the present exemplary embodiment, the start of the data transfer processing is triggered by the instruction determination unit 251 determining that the user has instructed the digital camera 101 to transfer the data via a button operation. In addition to the trigger described above, the start of the data transfer processing may be triggered by the user's operation of the operation unit 310 of the smart device 102 for requesting the digital camera 101 to transfer the data. The image (moving image or still image) data will be described as an example of the data to be transferred.

When the data transfer processing is started, in step S401, the transmission unit 259 transmits a data transfer start notification to the smart device 102, which is the transmission destination of the data. In step S402, the data determination unit 252 determines whether the transfer data is to be converted. The determination of whether the transfer data is to be converted is performed based on, for example, a format (data type), the image capture mode, and the size of the data. More specifically, when the data is the moving image data generated in a predetermined mode, it is determined that the data is to be converted. However, in addition to the determination method described above, other methods can be used. For example, if the user instructs the digital camera 101 to convert the data via the button operation, the data determination unit 252 may determine that the transfer data is to be converted.

When the data is to be converted (YES in step S402), the processing proceeds to step S403, and when the data is not to be converted (NO in step S402), the processing proceeds to step S407. In step S403, the conversion unit 253 sets conversion quality, and then the processing proceeds to step S404. The conversion quality refers to information indicating quality of the converted data that is determined by a bit rate, resolution, and a method such as coding. According to the present exemplary embodiment, the resolution of the data to be converted is not changed, and the conversion quality of the data to be converted is set to be the predetermined bit rate (4 Mbps), which is lower than that of the data before being converted. Further, the conversion quality may be set according the user's instruction.

In step S404, the estimation unit 254 estimates the approximate size of the converted transfer data. The approximate size is calculated by "size of header information+reproduction time×bit rate+cluster size of file system". However, it is not limited thereto. For example, a table in which the size before being converted and the size after being converted are associated with each other may be previously stored in the storage unit 204, and the estimation unit 254 may estimate the approximate size with reference to the table.

In step S405, the storage control unit 255 determines whether the storage unit 204 of the digital camera 101 has the enough free space for the transfer data with the approximate size. When the storage unit 204 has enough free space (YES in step S405), the processing proceeds to step S406. When the storage unit 204 has no free space (NO in step S405), the processing proceeds to step S418. In step S418, the display control unit 260 causes the display unit 206 to display an indication of failure of transfer, and the processing proceeds to step S419.

In steps S406 and S407, the notification unit 256 notifies the smart device 102, which is the transmission destination of the data, of the transfer data information, and then the processing proceeds to step S408. The transfer data information includes at least identification (ID), a format, the resolution, a size before being converted, and the approximate size of the data.

In step S408, the reception unit 257 receives the transfer permission or the transfer non-permission of the data from the smart device 102. The transfer permission permits to transfer the data from the digital camera 101 to the smart device 102, and the transfer non-permission does not permit to transfer the data.

In step S409, the transfer determination unit 258 determines whether the data can be transferred. The determination of whether the data can be transferred is performed based on the transfer permission or the transfer non-permission from the smart device 102 responding to the transfer data information notification. When the data can be transferred (i.e., when the transfer permission is received) (YES in step S409), the processing proceeds to step S410. When the data cannot be transferred (i.e., when the transfer non-permission is received) (NO in step S409), the processing proceeds to step S418. In step S418, the display control unit 260 causes the display unit 206 to display an indication of failure of transfer, and the processing proceeds to step S419.

According to the present exemplary embodiment, when it is determined that the data cannot be transferred, the data transfer processing is ended. However, when the transfer data is to be converted, the processing is not ended and may be returned to step S403 to continue the processing. At this point, the conversion quality is lowered than that set in a previous setting. For example, if the bit rate is 4 Mbps in the previous setting, the bit rate may be changed to 2 Mbps. With this arrangement, when the estimation unit 254 estimates the approximate size again, the approximate size is estimated to be smaller than that in the previous setting.

Therefore, the data before setting change of the conversion quality, which cannot be transmitted to the smart device 102, may be able to be transmitted after setting change of the conversion quality.

In step S410, it is determined whether the transfer data is to be converted. When the transfer data is to be converted (YES in step S410), the processing proceeds to step S411. When the transfer data is not to be converted (NO in step S410), the processing proceeds to step S414. In step S411, the conversion unit 253 converts the data and further, in step S412, notifies the smart device 102 of progress of the data conversion. The data can be converted by performing conversion encoding based on the conversion quality set in step S403 and estimation encoding for changing a frame configuration with only I frames to a configuration with I frames, P frames, and B frames. The I frame, the P frame, and the B frame are respectively referred to an Intra-coded frame, a Predicted frame, and Bi-directional Predicted frame. Method for converting the data is not limited to the methods described above. Further, as for the notification of the progress of the data conversion, a ratio of a reproduction time of the transfer data that has been converted relative to an entire reproduction time of the transfer data to be transferred is notified in a percentage notation. However, notification operation is not limited to the operation described above. The processing is continuously performed until the data conversion is completed (until YES is obtained in step S413). When the data conversion is completed, the processing proceeds to step S414.

In step S414, the transmission unit 259 transmits the transfer data to the smart device 102, and the processing proceeds to step S415. According to the present exemplary embodiment, when the transfer data is transmitted, the transfer data in an actual size is also transmitted. When the data is to be converted, the actual size refers to the data size after the data is converted, and when the data is not to be converted, the actual size refers to the data size before the data is converted. Based on the actual size, the smart device 102 can perform again determination of whether the transfer data can be stored. Further, the transfer data is divided into the packets for each predetermined size to be transmitted. However, a transfer operation is not limited to the operation described above.

In step S415, the reception unit 257 determines whether the notification indicating that the data cannot be transferred has been received from the smart device 102. When the notification indicating that the data cannot be transferred has not been received (NO in step S415), the processing proceeds to step S416, and when received (YES in step S415), the processing proceeds to step S418. In step S418, the display control unit 260 causes the display unit 206 to display an indication of failure of transfer, and the processing proceeds to step S419.

In step S416, the transmission unit 259 determines whether all the transfer data has been transmitted. When all the data has been transmitted (YES in step S416), the processing proceeds to step S417. The display control unit 260 causes the display unit 206 to display an indication of success of transfer, and the processing proceeds to step S419. When all the data has not been transmitted (NO in step S416), the processing returns to step S414. In step S419, the transmission unit 259 transmits data transfer completion notification to the smart device 102 and the data transfer processing is ended. According to the present exemplary embodiment, when the data transfer is failed due to a shortage of the free space of the digital camera 101, and also when the data transfer is failed due to the shortage of the free space of the smart device 102, the same display is indicated. However, display operation is not limited to the operation described above, the different display may be indicated depending on a cause of the transfer failure of the data. In this case, the cause of the failure of the data transfer is displayed on each of the displays. With this arrangement, which of the digital camera 101 and the smart device 102 should increase the free space can be determined to delete a file.

Figure 5:
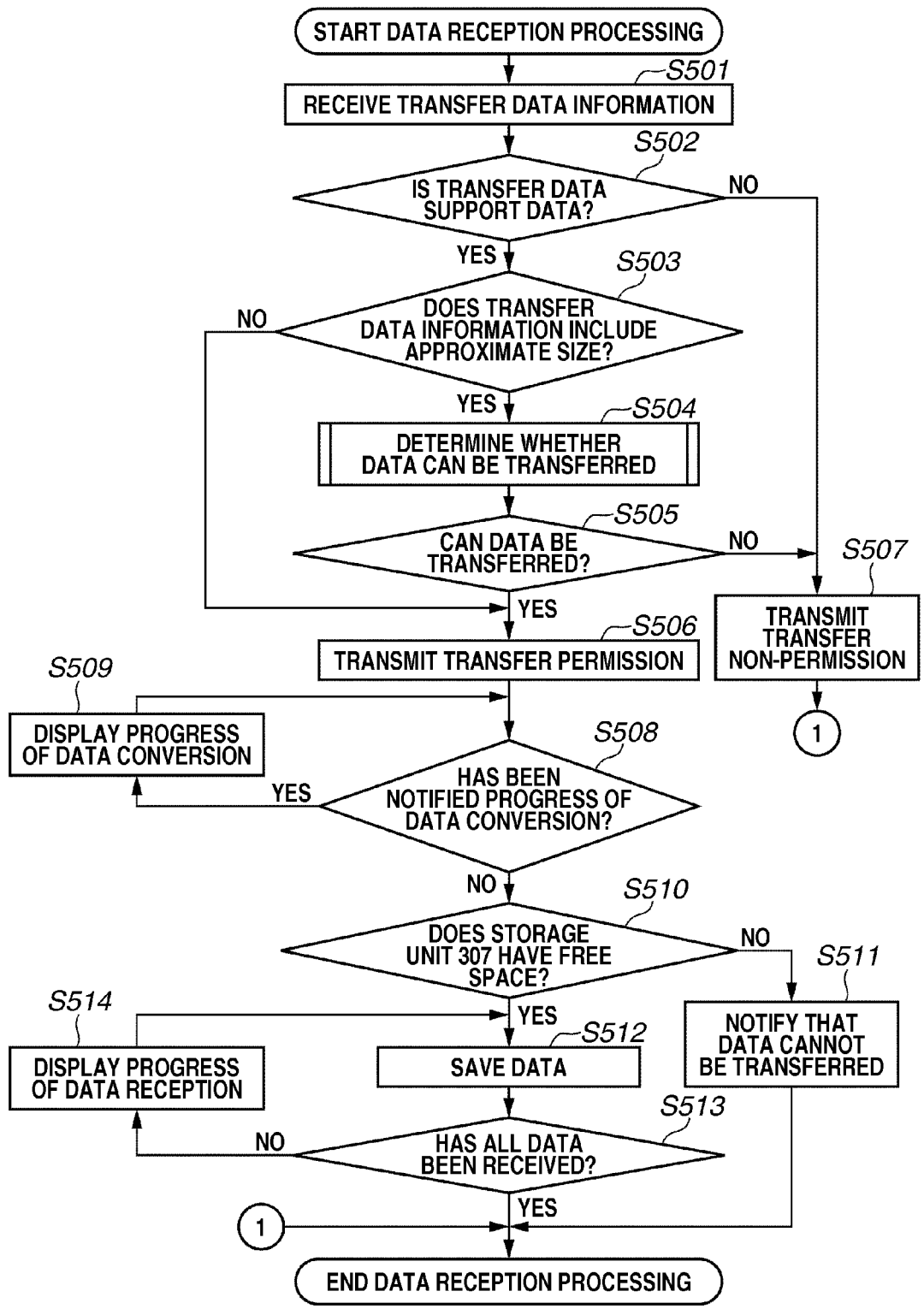
FIG. 5 is a flowchart illustrating data reception processing performed by the smart device according to the first exemplary embodiment.

FIG. 5 is an operation flow when the smart device 102 starts the data reception processing. The operation flow can be realized by reading and executing the program stored in the storage unit 307 by the control unit 306. According to the present exemplary embodiment, the start of the data reception processing is triggered by the digital camera 101 receiving the data transfer start notification. However, start operation is not limited to the operation described above.

In step S501, the reception unit 351 receives the transfer data information, and the processing proceeds to step S502. In step S502, it is determined whether the transfer data is support data. The determination of whether it is the support data is performed based on whether a format of the data included in the transfer data information is a reproducible format. However, determination operations not limited to the operation described above. When the transfer data is the support data (YES in step S502), the processing proceeds to step S503. When it is not the support data (NO in step S502), the processing proceeds to step S507. In step S507, the transmission unit 355 transmits the transfer non-permission as the transfer permission and non-permission response, and then the data reception processing is ended. When the transmission unit 355 transmits the transfer non-permission, the digital camera 101 does not perform the data conversion processing and the data transmission. In other words, the transfer non-permission can be referred to as a signal for stopping the digital camera 101 to perform the data conversion processing. With this arrangement, the digital camera 101 can be prevented from performing the data conversion processing and the data transmission even if the smart device 102 cannot receive the data due to the shortage of the free space.

Figure 6:
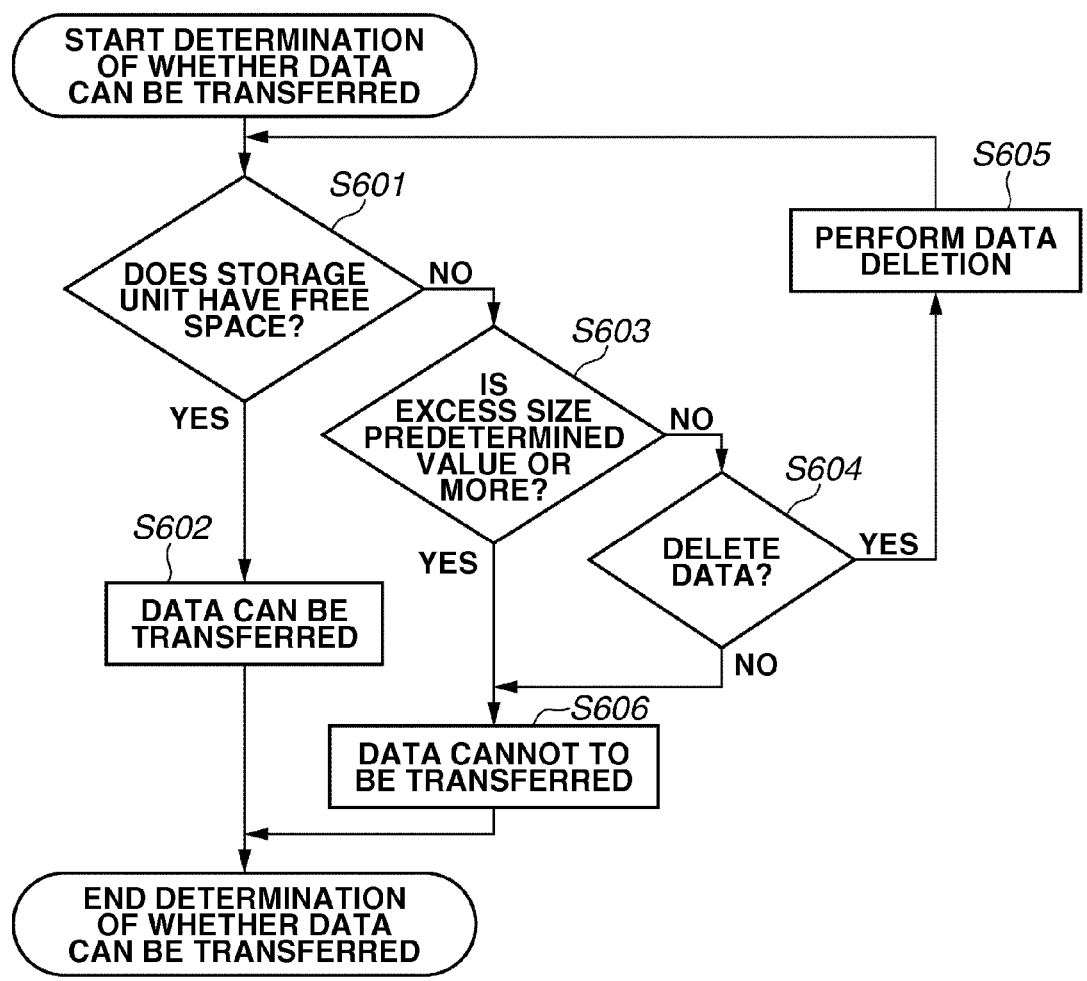
FIG. 6 is a flowchart illustrating transfer permission determination performed by the smart device according to the first exemplary embodiment.

In step S503, it is determined whether the transfer data information includes the approximate size of the transfer data. When the transfer data information includes the approximate size (YES in step S503), the processing proceeds to step S504. When the transfer data information does not include the approximate size (NO in step S503), the processing proceeds to step S506. In step S504, the transfer determination unit 354 determines whether the data can be transferred, and the processing proceeds to step S505. With reference to FIG. 6, details of the determination of whether the data can be transferred will be described below.

In step S601, the storage control unit 352 determines whether the storage unit 307 has the free space for the approximate size. When the storage unit 307 has the free space (YES in step S601), the processing proceeds to step S602. The transfer determination unit 354 determines that the data can be transferred, and then ends the transfer determination processing. Having the free space refers to that the approximate size received by the reception unit 351 is smaller than the free space of the storage unit 307.

On the other hand, when the storage unit 307 has no free space (NO in step S601), the processing proceeds to step S603. Having no free space refers to that the approximate size received by the reception unit 351 is larger than the free space of the storage unit 307. In step S603, the storage control unit 352 determines whether an excess amount of the approximate size relative to the free space is a predetermined value or more. The predetermined value refers to a space for 1 to 2 pieces of still image data, for example. When the excess amount is the predetermined value or more (YES in step S603), the processing proceeds to step S606. In step S606, the transfer determination unit 354 determines that the data cannot be transferred, and then ends the transfer determination. When the space is less than the predetermined value (NO in step S603), the processing proceeds to step S604. In step S604, the storage control unit 352 determines whether to delete unnecessary data. The unnecessary data refers to temporarily saved data or the data of which a predetermined period has elapsed since it has been stored. However, unnecessary data is not limited to the data described above.

Whether to delete the unnecessary data is determined depending on whether the storage unit 307 stores the unnecessary data. However it may be determined depending on another unit. For example when the user permits deletion via the button operation, the data specified to be deleted by the user is deleted. In this case, the excess amount may be notified to the user. With this arrangement, the user can be previously informed how much of the data and which data should be deleted.

When the data is deleted (YES in step S604), the processing proceeds to step S605. When the data is not deleted, the processing proceeds to step S606 (NO in step S604). In step S606, the transfer determination unit 354 determines that the data cannot be transferred, and the transfer determination is ended. In step S605, the deletion unit 353 deletes the data and the processing returns to step S601. The data deletion operation is for deleting the unnecessary data. However, the data is not limited to the unnecessary data. For example, the user may select the data to be deleted from existing data displayed in a list on the display unit 309. As described above, the data is deleted from the storage unit 307 so that the data in a size that cannot be saved in the storage unit 307 before can be saved by the deletion of the data.

Further, for example, the unnecessary data may be transmitted to a server (not illustrated) and stored in the server (i.e., the data is saved in the server), and then the saved data may be deleted. The server may be on the Internet, or on the LAN connected with the smart device 102 via a wired network or a wireless network. Furthermore, the data is not limited to be transmitted to the server but may also be transmitted to the digital camera 101. With this arrangement, since the unnecessary data is deleted from the storage unit 307 but saved in another device, the user can refer to the unnecessary data later and also the smart device 102 can obtain the converted data from the digital camera 101.

As a result of the processing illustrated in FIG. 6, when the data can be transferred (YES in step S505), the processing proceeds to step S506. When the data cannot be transferred (NO in step S505), the processing proceeds to step S507. In step S507, the transmission unit 355 transmits the transfer non-permission as the transfer permission and non-permission response, and ends the data reception processing. On the other hand, in step S506, the transmission unit 355 transmits the transfer permission as the transfer permission and non-permission response, and the processing proceeds to step S508. In step S508, the reception unit 351 determines whether the data conversion progress notification has been received from the digital camera 101. When the data conversion progress notification has been received (YES in step S508), the processing proceeds to step S509. The display control unit 356 causes the display unit 309 to display a data conversion progress ratio using a progress bar. In place of the progress bar, the data conversion progress ratio may be displayed as a value.

When the digital camera 101 starts the data transmission, the reception unit 351 of the smart device 102 receives the data and the processing proceeds to step S510. In step S510, the storage control unit 352 determines whether the storage unit 307 has the free space for the actual size included in the reception data. When the storage unit 307 does not have enough free space (NO in step S510), the processing proceeds to step S511. The notification indicating that the data cannot be transferred is transmitted to the digital camera 101, and the data reception processing is ended. When the transmission unit 355 transmits the notification indicating that the data cannot be transferred, the digital camera 101 instantly ends the data transmission. With this arrangement, the digital camera 101 can prevent from continuing the data transmission even if the smart device 102 cannot receive the data due to the shortage of the free space.

On the other hand, when the storage unit 307 has the free space (YES in step S510), then in step S512, the data is stored (saved) in the storage unit 307. Under receiving the data (NO in step S513), the display control unit 356 causes the display unit 309 to display data reception progress until all the data is received. The data reception progress is displayed with the ratio of the received data size to the size of the transfer data on the display unit 309 using the progress bar. However, display operation is not limited to the operation described above. When all the data is received (YES in step S513), the processing illustrated in FIG. 5 is ended.

An example of data transfer sequence between the digital camera 101 and the smart device 102 in configurations illustrated in FIGS. 1 to 6 will be described with reference to FIG. 7. The user releases a shutter a plurality of times via the operation unit 205. A video image captured for preceding four seconds for each shutter release is stored in the storage unit 204 as the moving image data. When the shutter is released five times with different timings, and then the moving images in total 20 seconds are stored in the storage unit 204. In other words, the moving image data is generated by combining a plurality of pieces of video data with one another. A bit rate of the moving image data is set to be 20 Mbps. The moving image data will be described below as the data to be converted.

In step M701, the user operates the digital camera 101 to start communication with the smart device 102. In step M702, in response to the operation, the digital camera 101 generates a wireless network, and in step M703, the digital camera 101 starts connection processing. In step M704, the user operates the smart device 102 to start a smart device cooperation mode. In step M705, in response to the operation, the smart device 102 searches the wireless network generated by the digital camera 101 to start the connection processing. In step M706, the connection processing is performed between the digital camera 101 and the smart device 102. The connection processing according to the present exemplary embodiment includes exchanging parameters of the wireless network, joining the wireless network, setting Internet protocol (IP) address information, and exchanging service information. In step M707, the user operates the digital camera 101 to instruct the data transfer. According to the present exemplary embodiment, the moving image, which is the data to be converted, is selected. In step M708, the digital camera 101 calculates an approximate size of the converted moving image. In step M709, when the digital camera 101 calculates the approximate size, the digital camera 101 transmits the transfer data information notification. The transfer data information notification includes the approximate size of the moving image. In step M710, upon receiving the transfer data information notification, the smart device 102 performs transfer permission and non-permission determination. In step M711, the smart device 102 transmits the transfer permission and non-permission response. It is determined that the data can be transferred. In step M712, the smart device 102 starts to receive the data. In step M713, upon receiving the transfer permission and non-permission response, the digital camera 101 starts to convert the data. In step M714, the digital camera 101 transmits notification of the data conversion progress. In step M715, upon receiving the notification of the data conversion progress, the smart device 102 displays the data conversion progress. In step M716, upon completing the data conversion, the digital camera 101 starts to transmit the data. In step M717, the digital camera 101 transmits the data. In step M718, upon receiving the data, the smart device 102 saves the data. In step M719, the smart device 102 displays the data reception progress. In step M720, upon completion of the data transmission, the digital camera 101 deletes the converted data.

According to the present exemplary embodiment, it is configured that, when the smart device cooperation mode is started, the digital camera 101 generates the wireless network so that the smart device 102 join the wireless network. However, another configuration may be applied. For example, the smart device 102 generates a wireless network so that the digital camera 101 joins the wireless network.

Further, the smart device 102 displays the data conversion progress and the data reception progress. However, the smart device 102 may not display them. For example, when the digital camera 101 is activated in a mode for operating only the digital camera 101, battery consumption of the smart device 102 can be reduced by not performing display.

Further, after the digital camera 101 completed the data transmission, the digital camera 101 deletes the converted data. However, the converted data may be deleted at different timing. For example, the converted data may be deleted when the free storage space is insufficient. With this arrangement, the data conversion process is omitted when the same data is transferred to another communication apparatus. Therefore, the time required for the data transfer can be reduced.

Furthermore, according to the present exemplary embodiment described above, the size of the converted data is estimated, and then the estimated size is notified to the communication partner, which is the transmission destination of the data. Notification operation is not limited to the operation described above, but a predetermined size may be notified to the communication partner. The predetermined size refers to, for example, a maximum value (e.g., 500 Mbyte) of the data size to be transmitted. With this arrangement, without performing the above-described estimation, a data size can be previously notified to the communication partner. When the communication partner already knows the maximum value of the size of the data to be transmitted, the data to be transmitted or the number of the data files to be transmitted may be notified to the communication partner to inquire whether to transmit the converted data. By performing processing for receiving the data corresponding to the maximum value of the data size to the communication partner, a similar effect can be obtained.

As described above, according to the present exemplary embodiment, without performing unnecessary processing in advance, the data can be more securely transferred. In other words, since, before the data is converted, the size of the converted data is estimated and the estimated size is notified to another communication apparatus, the other communication apparatus can determine whether to convert and transfer the data. Therefore, the data transfer can be prevented from being stopped after the data is converted.

A system or an apparatus with a storage medium storing a computer program of the software realizing the above-described function may be provided according to the present exemplary embodiment. In this case, a computer (central processing unit (CPU) and micro processing unit (MPU)) of the system or the apparatus reads and executes the program code stored in the storage medium. The computer program itself read from the storage medium realizes the above-described functions according to the present exemplary embodiment, and the storage medium storing the computer program is in the configuration of the present invention.

The storage medium for supplying the computer program includes a flexible disk, a hard disk, an optical disk, an optical magnetic disk, a compact disk-read only memory (CD-ROM), a CD-recordable (CD-R), a magnetic tape, a non-volatile memory card, a read only memory (ROM), and a digital versatile disk (DVD).

The computer may execute the read computer program so that, based on an instruction of a program code, an operating system (OS) running on the computer can perform a part or all of actual processing to realize the above-described functions.

Further, the computer program read from the storage medium is written into a memory included in a function extension board inserted in the computer and a function extension unit connected to the computer. Based on an instruction of the program code, the CPU included in the function extension board and the function extension unit may execute a part or all of the actual processing to realize the above-described functions.

According to the present invention, notification can be transmitted to another communication apparatus at data conversion when the data is converted and transmitted to the other communication apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
a conversion unit configured to convert data;
a first estimation unit configured to estimate, before the conversion unit converts the data, a size of the data after being converted by the conversion unit;
a notification unit configured to notify another communication apparatus of the size estimated by the first estimation unit;
a transmission unit configured to transmit the data converted by the conversion unit to said another communication apparatus; and
a reception unit configured to receive from said another communication apparatus information indicating whether to allow transfer of the data, as a response to the notification by the notification unit,
wherein the transmission unit transmits the data converted by the conversion unit to said another communication apparatus in a case where the reception unit receives information indicating that the transfer of the data is allowed, and does not transmit the data converted by the conversion unit to said another communication apparatus in a case where the reception unit receives information indicating that the transfer of the data is not allowed.

2. The communication apparatus according to claim 1, wherein before the conversion unit converts the data, the notification unit notifies said another communication apparatus of the size estimated by the first estimation unit.

3. The communication apparatus according to claim 1, wherein the conversion unit converts the data so as to reduce a size of the data.

4. The communication apparatus according to claim 1, further comprising a determination unit configured to determine a transfer instruction of the data issued by a user,
wherein in a case where the determination unit determines the transfer instruction of the data, the first estimation unit estimates the size of the data after being converted.

5. The communication apparatus according to claim 1, wherein the data is data of a moving image captured by an image capture unit, and
wherein the conversion unit converts a bit rate of the data.

6. The communication apparatus according to claim 5, wherein the first estimation unit estimates the size of the data after being converted, based on at least a bit rate of the data after being converted by the conversion unit and a reproduction time of the data.

7. The communication apparatus according to claim 1, wherein the data is data of an image captured by an image capture unit, and
wherein the conversion unit converts a resolution of the data.

8. The communication apparatus according to claim 1, wherein the data is data of a still image captured by an image capture unit.

9. The communication apparatus according to claim 1, wherein the conversion unit converts the data in a case where the reception unit receives information indicating that the transfer of the data is allowed.

10. The communication apparatus according to claim 1, wherein the conversion unit does not convert the data in a case where the reception unit receives information indicating that the transfer of the data is not allowed.

11. The communication apparatus according to claim 1, wherein the reception unit receives the information indicating that the transfer of the data is allowed, in a case where said another communication apparatus has a memory area for storing the data converted by the conversion unit, and
   wherein the reception unit receives information indicating that the transfer of the data is not allowed, in a case where said another communication apparatus does not have the memory area for storing the data converted by the conversion unit.

12. The communication apparatus according to claim 1, further comprising a change unit configured to change, in a case where the reception unit receives information indicating that the transfer of the data is not allowed, a conversion quality of the data after being converted by the conversion unit to an other conversion quality; and
   a second estimation unit configured to estimate a size of the data after being converted based on the other conversion quality.

13. A method for controlling a communication apparatus, the method comprising:
   converting data;
   estimating, before the data is converted, a size of the data after being converted;
   notifying another communication apparatus of the estimated size;
   receiving, from said another communication apparatus, information indicating whether to allow transfer of the data, as a response to the notifying; and
   transmitting the converted data to said another communication apparatus in a case where the received information indicates that the transfer of the data is allowed,
   wherein the converted data is not transmitted to said another communication apparatus in a case where the received information indicates that the transfer of the data is not allowed.

14. A non-transitory computer-readable storage medium for storing a program that causes a computer to perform a method for controlling a communication apparatus, the method comprising:
   converting data;
   estimating, before the data is converted, a size of the data after being converted;
   notifying another communication apparatus of the estimated size;
   receiving, from said another communication apparatus, information indicating whether to allow transfer of the data, as a response to the notifying; and
   transmitting the converted data to said another communication apparatus in a case where the received information indicates that the transfer of the data is allowed,
   wherein the converted data is not transmitted to said another communication apparatus in a case where the received information indicates that the transfer of the data is not allowed.

* * * * *